United States Patent [19]
Hoffman

[11] 3,760,648
[45] Sept. 25, 1973

[54] AUXILIARY BICYCLE BRAKE HANDLE

[76] Inventor: William B. Hoffman, 67 Ships Point Ln., Oyster Bay, N.Y.

[22] Filed: Dec. 18, 1972

[21] Appl. No.: 316,234

[52] U.S. Cl.................. 74/489, 74/471 R, 188/24
[51] Int. Cl......... B62k 23/06, B62l 3/02, G05g 9/00
[58] Field of Search................. 74/471 R, 488, 489, 74/551.1; 188/24

[56] References Cited
UNITED STATES PATENTS

| 3,403,577 | 10/1968 | Ozaki | 74/489 X |
|---|---|---|---|
| 3,596,530 | 8/1971 | Yoshigal | 74/489 X |
| 3,719,104 | 3/1973 | Dian | 74/489 |

Primary Examiner—Allan D. Herrmann
Attorney—Frank J. Jordan

[57] ABSTRACT

A braking device for use on a bicycle handle of the type used on a racing bicycle. The device includes a rigid bar or tube which connects the usual brake handle levers. This connecting bar or tube is attached to a handle extending generally toward the top of the bicycle handle bar so that the handle may be grasped by a bicycle rider while having his hands on the top of the bicycle handle bar.

10 Claims, 5 Drawing Figures

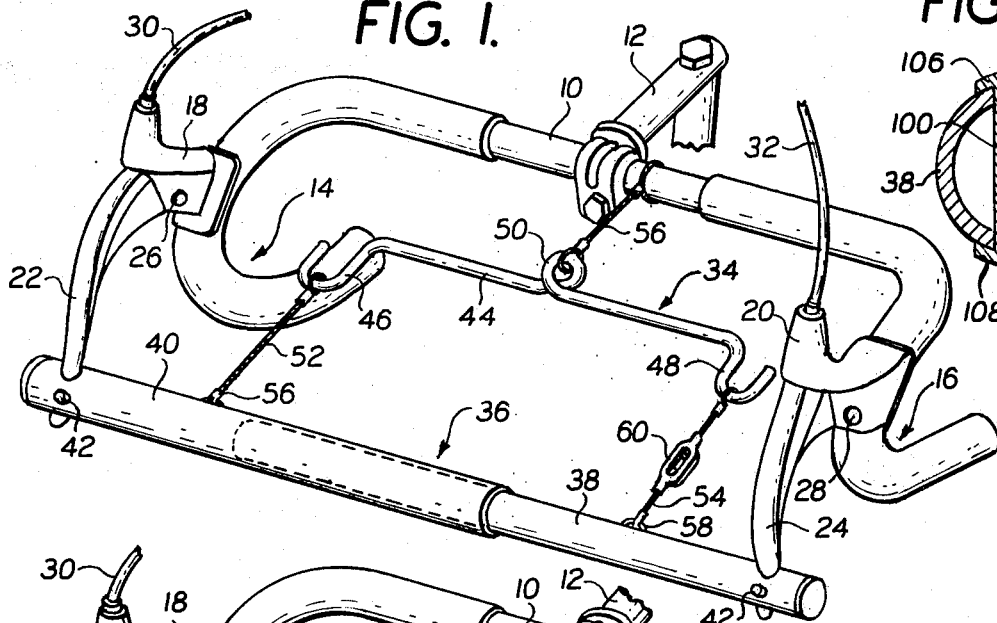

AUXILIARY BICYCLE BRAKE HANDLE

The present invention relates to a device for operating a brake of a bicycle and more particularly to an auxiliary brake handle which can be operated from various positions.

Drop handles are frequently used on racing bicycles which run at high speeds. These drop handles consist of a substantially horizontal straight rod section or cross bar provided on the fork shaft and substantially U-shaped bent rod sections which extend forwardly from both ends of the cross bar. Brake levers are attached to the U-shaped bent rod sections by means of brakets.

When running at high speed a rider will ordinarily grasp the U-shaped bent rod sections and in so doing will lean forwardly so as to minimize wind resistance. When leaning forward in this position the rider may easily extend his fingers to grasp the brake levers. However, when the rider is operating at a slower speed, for example when he becomes tired or is riding through traffic, he will want to sit straight up in the bicycle seat. When he does this he can no longer conveniently grasp the U-shaped bent rod sections of the handle because they are too far away and he therefore places his hands on the top of the bicycle handle bar. This position presents a potentially unsafe condition in that the rider is no longer able to reach the brake levers by extending his fingers. In order for the rider to apply the brakes he must remove his hands from the top of the bar and reach to the side and forwardly in order to grasp the brake levers. The necessity of having to reach for the brake levers in this manner results in a delay which might cause a mishap or accident.

Accordingly, it is the object of the present invention to overcome the aforementioned disadvantages of known prior art devices by providing an auxiliary brake handle which may be readily and conveniently operated from various positions on the bicycle handle and which may be grasped by the rider by extending the fingers of one or both hands.

Another object of the invention is to allow a rider to use the fingers of one hand to simutaneously operate both the front and rear brakes.

A further object is to provide an auxiliary handle arrangement which may be readily applied to existing bicycle handles.

The aforesaid objects of the present invention and other objects which will become apparent as the description proceeds, are achieved by providing an auxiliary handle in the form of a cross member which may be fitted to existing brake levers and wherein an auxiliary grasping member extends from the cross member to a position toward the top of the handle bar where it may be readily grasped by a rider who has his hands on the top of the handle bar.

Other features which are considered as characteristic of the invention are set forth in the appended claims.

Although the invention is illustrated and described in relationship to specific embodiments, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings, in which:

FIG. 1 is a perspective view of a drop handle as used on a racing bicycle and showing an auxiliary brake handle according to one embodiment of the present invention.

FIG. 2 is a perspective view of an auxiliary brake handle according to another embodiment of the invention.

FIG. 3 is a perspective of an auxiliary brake handle according to yet another embodiment of the invention.

FIG. 4 is a partial sectional view of a further alternate embodiment taken along a plane extending transversely of the hollow tube 38 at the area of attachment to the brake lever.

FIG. 5 is an elevational view looking from the right hand side of FIG. 4.

Before explaining the present invention in detail, it is to be understood the invention is not limited in its application to the details of construction and arrangement of parts illustrated in the accompanying drawings, since the invention is capable of other embodiments and of being practiced or carried out in various ways. Also, it is to be understood that the phraseology or terminology is for the purpose of description and not of limitation.

Referring to the drawings, FIG. 1 shows a conventional drop handle having a straight rod section or cross bar 10 secured to the fork 12 of a bicycle. U-shaped handle sections 14 and 16 are carried on the longitudinal ends of the cross bar 10. Support brackets 18 and 20 are secured to the U-shaped handle sections 14, 16 and pivotally mounted brake levers 22 and 24 extend from the brackets 18 and 20 respectively. It will be noted that the brake levers 22, 24 are located such that they may be readily grasped to apply the brakes when the rider has his hands on the U-shaped handle sections 14 and 16. The brake levers 22, 24 are pivoted at 26, 28 to actuate wire connectors 30, 32 which actuate braking elements (not shown) in a known manner.

According to the present invention, auxiliary handle means 34 are provided which permit the brakes to be readily applied when the rider has his hands on the top of the handle bar 10 of the bicycle handle. Both front and rear brakes may be activated simutaneously by the fingers of one hand.

The auxiliary handle 34 comprises a cross member 36 which is suitably attached to the brake levers 22, 24. The cross member 36 which may be in one piece or may comprise two telescoping tubes 38, 40 to provide for adjustable longitudinal lengths depending on the horizontal spacing between the two brake levers 22 and 24. The ends of the cross member 36 are provided with a passageway means in which the ends of the brake levers are accommodated and suitable secured by a fastening means such as a set screw 42 threadedly engaging the walls of the tubular cross member 36 and having a longitudinal end bearing against the brake levers 22, 24. The set screw may fit into the underneath part of the brake lever and be mounted so that it aims toward the front of the bicycle.

A rod 44 having U-shaped ends 46, 48 and a central loop 50 is mounted between the top of the handle bar 20 and the cross member 36 by suitable means such as the wires 52, 54 and 56. Thus, wire 52 connects U-shaped end 46 with cross member 36 at 56, wire 54 connects U-shaped end 48 with cross member 36 at 58, and wire 56 connects loop 50 with the top of the handle bar 10 of the bicycle handle. Rod 44 can be of many shapes the simplest one being a straight tube or bar with three holes in it, one in the middle and one at each end. Alternatively the wire 56 may also be affixed to the fork 12. Also adjustable means such as the turnbuckle 60 may be provided for adjusting the length and the tension in any one of the wires 53, 54 56.

In the above described arrangement it will be seen that the rod 44 is disposed adjacent to the top of the handle bar 10 so that a rider who has his hands on the handle bar top 10 may readily extend his fingers to grasp the rod 44 to pull the latter toward him and thereby apply the brakes. Thus a rider who is riding his bicycle with his hands on the top of the bar 10 can readily by means of the fingers of one hand apply the front and rear brakes quickly without having to move his arms or changing the position of his hands. It will also be seen that the auxiliary brake handle device 34 may be easily mounted on existing bicycles of various sizes inasmuch as adjustment means are incorporated in the auxiliary brake handle to provide for varying spacing between the two brake levers 22, 24 and between the latter and the cross bar 10.

FIG. 2 shows an alternate embodiment wherein a cross member 64 is suitably attached to the brake levers 22, 24 in the same manner as in the embodiment of FIG. 1. The cross member 64 is in the form of a one piece circular tube or of a telescoping tube having a central tube 66 slidable in two outer tubes 68, 70. The central tube 66 has a projection 72 to which a T-shaped bar 74 is attached, for example by providing an opening in which the projection 72 is received and fitting a fastening means 76 to the end portion of the projection 72. The rear end portion of the T-shaped bar 74 is secured to the handle bar top 10 by a wire 78 or other means of fastening.

It will be seen in FIG. 2 that handle portions 80, 82 of the T-shaped bar 74 extend adjacent to handle bar top 10 where such handles 80, 82 may be conveniently grasped by the rider who has his hands on the top of the handle bar 10 as in the case of the embodiment of FIG. 1.

FIG. 3 shows a further alternate embodiment comprising a cross member 86 having its longitudinal end portions attached to the brake levers 22, 24 in the same manner as in the previous embodiments. The cross member 86 may be in one piece of may be of a telescopic construction comprising a central square tube 88 in which two end bars 90, 92 are slidably mounted. An arcuate rod 94 is fixed to the square tube 88 and extends adjacent to the top of the handle bar 10 of the bicycle handle where it is held in place by a wire 96, or other means of fastening. Here again it will be seen that the rod 94 may be grasped by the rider who may activate both front and rear brakes by one or two hands as he uses the top handle bar position.

FIGS. 4 and 5 show and alternate arrangement for attaching the cross member 36, 64 or 86 to the brake levers 22 and 24. For the sake of facilitating the description only an arrangement will be described for attaching the rod 38 to the brake lever 24 although it will be understood that any of the cross members 36, 64 or 86 may be mounted on the brake levers 22, 24 in the same manner.

Referring to FIGS. 4 and 5 a bushing 100 is mounted in aligned openings 101,103 in the hollow tube 38. The bushing 100 has a central opening receiving the brake lever 24 and a set screw 102 secures the brake lever 24 to the bushing 100.

An opening 104 in the hollow tube 38 provides external access to the set screw 102. The bushing 100 has flanges 106, 108 at its longitudinal ends which maintains the bushing 100 in place on the tube 38 by preventing longitudinal displacement of the bushing 100 relative to the tube 38. The bushing 100, although it is not movable longitudinally, is free to rotate in the openings 101, 103 in the tube 38. The bushing 100 may initially have one longitudinal end provided without a flange 106 (or 108) and after the bushing 100 is inserted in the openings 101, 103, the flange 106 (or 108) may be formed in place by peening over the end of the bushing 100 to form the flange 106 (or 108).

The above described mounting arrangement permits the cross member 36 to be rotated about either brake lever 22 or 24. Thus if one brake lever 22 or 24 requires a greater pivotal movement about its pivot 26 or 28 before the brake grabs, the tube 36 will pivot about the brake lever 22 or 24 having the lesser pivotal movement requirement until the other brake lever grabs thereby providing equalized braking pressure on the brake levers 22, 24. Expressed otherwise, the pivotal mounting of the cross member 36 on the brake levers 22, 24 provides equalized pressure on both brake levers 22, 24 when the brakes are applied through the auxiliary braking device. Thus both brakes can be activated by one hand.

While the invention has been described by means of a specific example and in a specific embodiment, I do not wish to be limited thereto, for obvious modifications will occur to those skilled in the art without departing from the spirit and scope of the invention.

What I claim is:

1. A braking device for use on a racing bicycle handle of the type having a cross bar and handle portions at the ends of said cross bar extending generally transversely of said cross bar and on which pivotal brake handle levers are mounted comprising auxiliary brake handle means extending generally toward said cross bar, and mounting means mounting said auxiliary brake handle means on said pivotal brake handle levers, whereby said auxiliary brake handle means may be grasped by a rider while having his hands on said cross bar or other locations of the bicycle handle.

2. A braking device according to claim 1 wherein said auxiliary handle means comprises a cross member extending between and secured to said brake handle levers, and extension means extending to a position between said cross bar and said cross member.

3. A braking device according to claim 2 wherein said cross member comprises at least two elongated elements, one of which is telescopically received in the other.

4. A braking device according to claim 2 wherein said extension means comprises a rod element disposed generally parallel to said cross bar, and means mounting said rod element between said cross bar and said cross member.

5. A braking device according to claim 2 wherein said extension means has a T-shaped configuration.

6. A braking device according to claim 2 wherein said extension means comprises a rod of arcuate configuration and having its ends secured to said cross member.

7. A braking device according to claim 1 wherein said mounting means comprises pivotal means providing for pivotal movement of said corss member about an axis disposed transversely of the longitudinal axis of said cross member and generally coincident with the longitudinal extent of said brake levers.

8. A braking device according to claim 2 wherein said mounting means comprising a bushing element disposed transversely in said cross member, fastening means accessable externally of said cross member securing said brake lever to said bushing element, and means mounting said bushing element with said cross member to provide for pivotal movement of said cross member as said bushing element turns in said cross member.

9. A braking device according to claim 1 wherein said auxiliary handle means is provided with adjustable means adopting it to be mounted on existing bicycle handles of varying dimensions.

10. A braking device according to claim 2 including means securing said extension means to said bicycle handle.

* * * * *